United States Patent [19]

Rainer

[11] Patent Number: 5,336,704

[45] Date of Patent: Aug. 9, 1994

[54] PROCESS FOR INSOLUBILIZING ABSORBED METAL IONS

[76] Inventor: Norman B. Rainer, 2008 Fondulac Rd., Richmond, Va. 23229-4219

[21] Appl. No.: 17,598

[22] Filed: Feb. 16, 1993

Related U.S. Application Data

[63] Continuation-in-part of Ser. No. 808,884, Dec. 18, 1991, Pat. No. 5,187,200.

[51] Int. Cl.$^5$ .................. C08L 11/00; C08J 5/20; C08G 69/26; B01D 15/00
[52] U.S. Cl. .................. 524/30; 521/25; 521/30; 527/312; 527/313; 210/670; 210/688; 210/679; 210/681; 210/683; 210/690; 210/691; 210/711; 428/473.5; 528/341; 528/342
[58] Field of Search .............. 524/30; 521/25, 30; 527/312, 313; 210/670, 688, 679, 711, 681, 683, 690, 691; 428/473.5; 528/341, 342

[56] References Cited

U.S. PATENT DOCUMENTS

| | | |
|---|---|---|
| 3,580,891 | 5/1971 | Rainer ........................ 524/30 |
| 3,715,339 | 2/1973 | Rainer ........................ 524/30 |
| 4,332,916 | 6/1982 | Thill ........................... 521/25 |
| 5,002,984 | 3/1991 | Rainer ........................ 524/30 |
| 5,096,946 | 3/1992 | Rainer ........................ 524/30 |
| 5,162,404 | 11/1992 | Rainer ....................... 524/30 |
| 5,169,883 | 12/1992 | Rainer ....................... 524/30 |
| 5,187,200 | 2/1993 | Rainer ........................ 524/30 |

FOREIGN PATENT DOCUMENTS 2023387  2/1991  Canada .

*Primary Examiner*—John Kight, III
*Assistant Examiner*—P. Hampton-Hightower
*Attorney, Agent, or Firm*—Norman B. Rainer

[57] ABSTRACT

Metal cations absorbed within a hydrogel chelation polymer are insolubilized for safe disposal by treating the polymer with a precipitative anion such as carbonate, aluminate, hydroxide, phosphate, silicate, or sulfide. Further insolubilization of the metal cations may be achieved by subsequent treatment of the polymer with a water-dilutable prepolymer composition such as phenol-formaldehyde resin, then heating to cause crosslinking of the prepolymer. The hydrogel chelation polymer, containing metal sulfide formed by virtue of the insolubilization process, is useful in abstracting from water metals whose sulfides are less soluble than the metal sulfide initially within the polymer.

12 Claims, No Drawings

PROCESS FOR INSOLUBILIZING ABSORBED METAL IONS

RELATED APPLICATIONS

This application is a continuation-in-part of U.S. patent application Ser. No. 07/808,884, filed Dec. 18, 1991 now U.S. Pat. No. 5,187,200.

BACKGROUND OF THE INVENTION

1. Field of the Invention

This invention concerns a process for abstracting toxic metal ions from aqueous solution and causing the abstracted ions to resist re-dissolving in water.

2. Description of the Prior Art

Numerous materials have earlier been disclosed for absorbing from aqueous solutions dissolved toxic metal cations such as $Cd^{++}$, $Pb^{++}$, $Hg^{++}$, $Ag^+$, $Zn^{++}$, $Co^{++}$ and $Ni^{++}$. Although the treated water may be safer for human use, a problem arises with respect to the ultimate disposal of the absorbent material containing the toxic species. For example, if the absorbent containing toxic species is disposed of by burying in a landfill, the toxic species will, in the course of time, leach out into ground water to again become environmentally dangerous.

In recognizing the significance of this problem of ultimate disposal of toxic substances, the United States Environmental Protection Agency instituted in March 1990 a standardized test procedure known as the Toxicity Characteristic Leaching Procedure (TCLP), described in 40 C.F.R. Part 261. This test subjects a solid specimen to agitation with a dilute solution of acetic acid. The acetic acid solution is subsequently filtered, and the filtrate is analyzed for particular species. If the concentration of a toxic species in the filtrate is found to exceed certain specified limits, the solid specimen is considered to be a hazardous material and unsuitable for disposal in ordinary landfill sites.

Certain hydrogel types of ion exchange polymers having the ability to selectively absorb transition heavy metal ions by virtue of a chelation or complexation mechanism have been disclosed in U.S. Pat. Nos. 3,715,339 and 5,096,946, and in allowed parent patent application Ser. No. 07/808,884, filed Dec. 18, 1991 now in U.S. Pat. No. 5,187,200. In general, said polymers are produced by the insolubilization of an aliphatic amine such as polyethyleneimine (PEI) with a polyfunctional co-reactant. The polymers have a gel structure capable of absorbing water with attendant swelling. Preferred polymers will hold between 90% and 300% of water based upon the dry weight of polymer. Such polymers will hereinafter be referred to as hydrogel chelation polymers, or simply as "polymers." In certain applications, the polymer may be disposed within an open cell cellulosic sponge to achieve easier handling and other advantages in the treatment of flowing streams of water.

When hydrogel chelation polymers, whether in granular, bead or sponge form, become saturated with absorbed metal cations, several alternative procedures are usually available for the ultimate disposal of the metal. In one procedure, the metal is eluted from the polymer, and the metal in the elutriate is recovered by evaporation, precipitation or electrodeposition. In an alternative procedure, the metal-laden polymer is incinerated. This approach, which is feasible only when the toxic metal species is non-volatile, causes the metal to reside in the ash of the polymer. In a third possible procedure, the saturated polymer is disposed of by dumping in a landfill. In a fourth alternative, the polymer in sponge form is treated in a manner to create a useful and safe by-product. The process of the present invention concerns said third and fourth approaches to the handling of metal-saturated hydrogel chelation polymers.

It is accordingly an object of the present invention to provide a process for the safe disposal of hydrogel chelation polymer containing absorbed toxic metal species.

It is a further object of this invention to provide a process as in the foregoing object which is economical in terms of operating costs and equipment requirements.

These and other beneficial objects and advantages will be apparent from the following description.

SUMMARY OF THE INVENTION

The above and other beneficial objects and advantages are accomplished in accordance with the present invention by treating with a precipitative anion a hydrogel chelation polymer in water-swollen form containing absorbed toxic metal cation species. The precipitative anion is a member selected from the group consisting of carbonate, aluminate, hydroxide, phosphate, silicate and sulfide. The specific anion selected for use with a given metal is such that the solubility product (Ksp) for a compound formed by the interaction of a metal cation (M) with a precipitative anion (A) is smaller than $1 \times 10^{-10}$, as expressed by the equation:

$$K_{sp} = [M^+][A^-]$$

where $M^+$ is the concentration in moles/liter of the metal cation, and $A^-$ is the concentration in moles/liter of the precipitating anion. In the most generalized case, where the compound is $M_xA_y$, the solubility product is:

$$K_{sp} = [M]^x[A]^y$$

The most preferred anion is sulfide. The sulfide ion may be provided by hydrogen sulfide gas or an aqueous solution inorganic sulfide salt such as sodium sulfide.

In a further aspect of this invention, the hydrogel chelation polymer, following treatment with sulfide ion, is treated with a water-dilutable prepolymer and cured to cause formation of a cross-linked polymer coating upon said polymer. Preferred prepolymers are phenol-formaldehyde and urea-formaldehyde compositions which can be thermally cured by a condensation mechanism.

The hydrogel chelation polymer which is treated in accordance with this invention exists in a fluid-permeable, porous format. For example, the polymer may be in the form of a bed of granules having a mesh size in the range of about 20 to 100 mesh (U.S. Sieve Series).

In a particularly preferred embodiment, the fluid-permeable format of the hydrogel chelation polymer is comprised of an open-celled cellulosic sponge product containing said polymer in an amount constituting between 30% and 70% of the overall dry weight of said sponge product. The sponge product is preferably of cuboid configuration having an average volumetric size less than a cubic inch.

The hydrogel chelation polymer employed in the process of the present invention is preferably one produced by the insolubilization of polyethyleneimine (PEI) with a multi-functional carboxylic acid. Polyethyleneimine, a water-soluble branched chain polymer having recurring secondary amino nitrogen atoms, is commercially available in molecular weights ranging from 1200 to 60,000. Preferred polycarboxylic acids are those which additionally contain amino nitrogens, typical embodiments including iminodiacetic acid, ethylenediamine tetraacetic acid and nitrilotriacetic acid. The resultant insolubilized or cross-linked PEI preferably contains pendant carboxyl groups by virtue of the multi-functional carboxylic acid.

A typical hydrogel chelation polymer is produced by initially dissolving the otherwise insoluble multi-functional carboxylic acid in an aqueous solution of PEI to produce a homogeneous precursor mixture. The water of solution is then removed, preferably by heating, thereby producing a stiff paste. The paste is subjected to thermal curing at temperatures in the range of 130 degrees C. to 170 degrees C. and preferably in an oxygen-free environment to achieve an amide-type condensation cross-linking reaction which produces a water-insoluble gel polymer product that swells in water. The extent of cross-linking of the gel polymer is controlled primarily by the ratio of PEI/polycarboxylic acid and the time and temperature of the curing cycle. The gel polymer product absorbs water in amounts generally indicative of the extent of cross-linking. For example, highly cross linked polymers absorb less than 90% of water based upon their dry weight. Very slightly cross-linked polymers can absorb as much as 500% of water. It has been found that hydrogel chelation polymers having a water absorption capacity less than 90% lack adequate ion exchange capacity, and polymers having a water absorption capacity over 300% lack adequate cohesive strength.

The amount of water absorbable by the gel polymer is measured by blotting excess water off a mass of fully water-swollen polymer, weighing, heating to dryness, and re-weighing. The percent water absorption is expressed as the weight of water divided by the dry weight of the polymer times one hundred. In those instances where the polymer is incorporated into a sponge, the percent water absorption is measured on a polymer of identical composition cured in identical manner in the absence of the sponge.

The hydrogel chelation polymer, whether in granular sponge form, is generally employed disposed as a bed in a vertical column through which water is passed for metal-removal treatment. Metal cations in the water become chemically bound to the polymer by formation of ionic bonds with carboxyl groups, and formation by coordination bonds with amine groups.

Regardless of the exact manner of chemical bonding, the polymer interacts with a stoichiometric amount of the metal ion. By this it is meant that each polymer type can reproducibly saturate with a specific quantity of a particular metal ion. Any metal ions present beyond the stoichiometric amount are not chemically bound, and can be removed by physical methods such as extraction with water. It is to be understood however, that the amount of chemical bonding may be governed by general considerations of chemical equilibrium. Accordingly, excess extraction of a metal-containing polymer with pure water may in some instances cause a slight loss of metal ions, the magnitude of the loss being dependent upon an equilibrium constant. This principle also explains why metals may leach out of said polymers by ground water in a landfill disposed site.

Polymers employed in accordance with the present invention, containing stoichiometric or saturation quantities of metal cations, generally contain a weight of metal ion in the range of 2% to 20%, based upon the dry weight of polymer. The exact weight of metal content is dependent upon the particular nature of the polymer and the valence and atomic weight of the metal ion.

In one embodiment of the process of the present invention, a stationary bed of metal-saturated polymer in water-swollen, fluid-permeable form confined within a vertical cylindrical column is treated with an aqueous solution containing 1% to 5% of sodium sulfide.

It has been found that such treatment of the metal-saturated polymer with a sulfide converts the metal ions into their respective insoluble sulfides. The metal sulfides, although initially formed at the molecular level, associate to form particles which remain trapped within the gel structure of the polymer. The resultant product containing metal sulfides, has been found to have less propensity for loss of metal by water leaching, and will pass the aforesaid TCLP test. Accordingly, the product may be disposed of in an uncontrolled landfill site.

In certain instances, the polymer containing metal sulfide may possess special utility. This is particularly the case where the metal involved is iron. Polymer which contains ferric sulfide is useful in specialized water treating applications. For example, oxidizing agents such as chlorine, oxygen, ozone and chromate can be removed by chemical reactions wherein the chemically combined sulfur functions as a reducing agent. The following equation is exemplary:

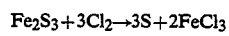

$Fe_2S_3 + 3Cl_2 \rightarrow 3S + 2FeCl_3$

In another useful application, ferric sulfide contained by the polymer serves as a source of sulfide ion to cause less soluble metal sulfides to deposit within the gel. The following equation is typical of such reaction:

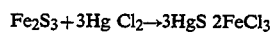

$Fe_2S_3 + 3Hg\ Cl_2 \rightarrow 3HgS\ 2FeCl_3$

In certain industries, and in municipal sewage treatment plants, hydrogen sulfide gas is generated as an undesired pollutant. The metal-saturated chelation polymers may be beneficially utilized to absorb the hydrogen sulfide, which convents the absorbed metal to its sulfide form in accordance with the process of this invention.

The following examples are presented for illustrative purposes without intending to be limitations of the scope of the invention. All parts and percentages are by weight.

EXAMPLE 1

A hydrogel chelation polymer suitable for use in the process of the present invention was produced by initially preparing a precursor solution consisting of 11 parts nitrilotriacetic acid, 10 parts PEI having a molecular weight of 1800, and 39 parts water. The solution was poured into a stainless steel tray which was placed in an oven maintained at 160 degrees C. Water of solution was initially evaporated, producing a highly viscous paste. With continued heating, the paste cured to a polymer in the form of a rigid bubbled mass. Water was added to the bubbled mass, and the polymer self-granulated by decrepitation to form water-swollen granules. The granules were wet sieved to obtain fractions of reasonably uniform particle size. The water absorption of the granules is 133%.

In a separate procedure, a portion of the precursor solution is utilized to impregnate a multitude of open celled cellulosic sponges of cubic centimeter configuration. The impregnated sponges were dried at 115 degrees C., cured at 155 degrees C. for one hour, then washed with water. The resultant sponge product was found to contain 63% by weight of hydrogel polymer, yet still retained its open-celled porous characteristics.

In separate batches, the polymer in granule and sponge form was loaded into vertical columns for treatment to saturation with various water soluble toxic metal compounds. Solutions of toxic metal salts were made by dissolving into saturated sodium chloride solution quantities of the chloride salt of the toxic metal to provide a 0.2% concentration. A sufficient volume of a selected solution was passed through the column at a flow rate of 0.1 bed volume/minute to saturate the polymer. Because of the large excess of sodium ion present in the solutions, the toxic metal that is absorbed by the polymer is assuredly bonded to the polymer by chelation or coordination chemical bonding which discriminates between sodium ions and multivalent cations.

EXAMPLE 2

Hydrogel chelation polymer in 20/40 mesh granular form, produced as disclosed in Example 1, was placed in a one inch diameter column of transparent plastic to form a bed of 10 inch height. The bed of granules was saturated with $Pb^{++}$ by passing an aqueous $NaCl/PbCl_2$ solution downwardly through the bed as described in Example 1. The point of saturation was ascertained when the concentration of lead in the effluent solution was found to be substantially equal to the concentration of lead in the ingoing solution.

The bed of granules was washed with distilled water to remove any traces of lead that are not chemically bound to the granules. The resultant granules are found to contain 124% water and 7.8% lead (dry weight basis). An aqueous solution of 3% sodium sulfide was then passed slowly through the bed. As the sulfide solution descends the bed, the granules undergo a color change from amber to dark black. The black color represents particles of water-insoluble lead sulfide (PbS) that are formed and retained within the gel polymer.

The lead-saturated granules, before and after treatment with the sulfide solution, were subjected to the TCLP test procedure, which involves tumbling the samples for 18 hours in jar containing a dilute acetic acid solution, then filtering the solution through a 0.7 micron filter, and analyzing the filtrate for the concentration of the toxic metal ion. Said flitrate, derived from the testing of lead-saturated granules having been treated by the sulfide solution pursuant to the process of this invention has a lead content less than 1 ppm.

Although not wishing to be bound by theoretical interpretations, it is felt that lead sulfide forms because the dissociation constant for the metal-polymer bond is greater than the solubility product of lead sulfide. This means that, in competing for the lead, the sulfide ion is more effective than the functional groups in the chelation polymer. The lead sulfide becomes trapped within the gel physical structure of the polymer.

EXAMPLE 3

A multitude of the cubes of polymer-containing porous sponge prepared as described in example 1 were packed into a plexiglas tube of 4" I.D. The sponges formed a bed of 36" height. The bed of sponge was saturated with $Hg^{++}$ by passing an aqueous $NaCl/HgCl_2$ solution downwardly through the bed as described in Example 1.

The bed of saturated sponge was washed with distilled water at 40 degrees C. to remove mercury that is not chemically bound to the polymer carried by the sponge. The resultant sponge is found to contain 7.3% Hg (dry weight basis). An aqueous solution of 3% sodium sulfide was then passed slowly through the bed. As the sulfide solution descends the bed, the granules undergo a color change from amber to dark black. The black color represents particles of water-insoluble mercuric sulfide (HgS) that are formed and retained within the gel polymer. The black sponge was subjected to the TCLP test. The result showed a mercury level of 0.18 ppm, which is below the sought ceiling level of 0.20 ppm.

In a separate, test, some of the mercury-saturated sponge was dried to a water content of about 34%. At such water content, the sponge is squeezable, namely easily compactible and resilient. The sponge is then treated with a water-dilutable phenol-formaldehyde prepolymer (grade GP 5432, Georgia Pacific Company, Georgia). The sponge was then run through a roller-wringer which causes the pre-polymer to distribute evenly throughout the sponge, and removes excess pre-polymer. The resultant sponge, having an add-on of pre-polymer of about 60% is then cured in an oven at 150 degrees C. The resultant product is a brittle non-resilient, non-water absorbent porous material. When subjected to the TCLP test, the material provides a mercury level less than 0.05 ppm. This value is considerably lower than the ceiling level of 0.20 ppm.

In an alternative procedure, the mercury-saturated sponge was dried, and equilibrated to ambient air, thereby acquiring a moisture content of 14.3%. This sponge was then impregnated with the aforesaid phenol-formaldehyde prepolymer into which sodium sulfide solution was incorporated. The added water content of the pre-polymer serves to soften the sponge, and the sulfide causes conversion of absorbed $Hg^{++}$ to HgS. The impregnated sponge was run through a roller wringer to uniformly distribute the pre-polymer and remove any excess. A multitude of the squeezed, still wet sponges was placed in a plunger-type heated mold. The mold was placed upon a 20 ton hydraulic press, and the sponges were compacted 12× while heated at 165 degrees C. The resultant product is a strong, board-like material eminently suited for structural uses. Pieces of the board were removed, subjected to the TCLP test, and found to produce less than 0.05 ppm Hg.

EXAMPLE 4

Some 20/40 mesh hydrogel chelation polymer granules prepared as described in Example 1 were placed in a 1" I.D. Plexiglas tube to form a bed of 10" height. The bed was saturated with silver by passing a solution of $AgNO_3/NaNO_3$ through the bed. The saturated bed was thoroughly washed with distilled water to remove unabsorbed $Ag^+$. Some of the granules were removed for TCLP testing. The remainder of the bed was treated with a 5% sodium carbonate solution. As the carbonate contacts the granules, the color changes from amber to white.

The $Ag^+$-saturated granules, without a stabilizing treatment with a precipitative agent such as carbonate, were found to give a TCLP value of 9.6 ppm, which is above the prescribed upper limit of 5 ppm. The carbonate-treated granules, however, provide a TCLP value of 2.5 ppm. This means that the treated granules can be shipped as a non-hazardous material to a facility which can recover the silver.

EXAMPLE 5

A Plexiglas tube of 1" I.D. and 15" length is filled with 20/40 mesh granules of the hydrogel chelation polymer of Example 4. Porous plugs at each extremity of the tube retained the granules. The granules were saturated with $Fe^+$, washed with water, then treated with $Na_2S$ solution, and washed again. The tube consequently contains a bed of hydrogel granules containing iron sulfide. A valuable use of the granules is demonstrated by the following procedure.

A de-oxygenated water solution containing 2 ppm Hg was flowed through the bed at a rate of 0.05 bed volume/minute. The effluent was found to be devoid to mercury. This phenomenon is explained by the fact that other sulfides, such as those of cadmuum, mercury, lead and silver, are less soluble than iron sulfide. The iron therefore gives up its sulfide ion to cause the less soluble metal sulfide to form and be entrapped within the gel structure of the polymer. The following equation is generally expressive of such phenomenon.

$$3HgCl_2 + Fe_2S_3 \rightarrow 3HgS + 2FeCl_3$$

EXAMPLE 6

Employing an experimental procedure similar to that described in Example 3, sponge containing hydrogel chelation polymer was treated with cadmuum chloride. The washed, saturated sponge was found to hold 11% $Cd^{++}$ (dry weight basis). The sponge was then treated in separate batches with aqueous 3% solutions
of sodium aluminate, sodium hydroxide and sodium orthosilicate.

The resultant treated sponges were then dried to a water content of about 32%, treated with phenol-formaldehyde prepolymer, and thermally cured at 155 degrees C. The cured sponges were subjected to the TCLP test. The results obtained are reported below:

| Treatment | TCLP Leachate Concentration (ppm) |
|---|---|
| none | 3.85 |
| aluminate | 0.70 |
| hydroxide | 0.83 |
| orthosilicate | 0.69 |

Suitable prepolymers for use in the present invention include those produced from the interaction of phenol and formaldehyde wherein a water-dilutable liquid composition known as a resole is initially produced. The resole undergoes cross linking upon heating to produce a water insoluble polymer. The amount of such polymer applied to the hydrogel polymer, whether in granular or sponge foam, should be in the range of 20% to 50% of the weight of the hydrogel polymer.

Other suitable prepolymers are those produced by the interaction of urea or melamine with formaldehyde. Further suitable prepolymers include individual organic compounds that are dispersible in water and capable of undergoing condensation-type polymerization with heating, exemplary compounds being dimethyloldihydroxyethylene urea, dihydroxyethylene urea, N,N-dimethylolethyl carbamate, and Bis (N, $N^1$ meth oxymethyl) uron. The expression "condensation-type polymerization" is intended to denote a polymerization wherein small molecules join together in chain-wise manner by virtue of the elimination of a molecule of water at each site of joinder.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A process for insolubilizing toxic metal cations absorbed within a hydrogel chelation polymer comprising treating said polymer in water-swollen form with a precipitative anion selected from the group consisting of carbonate, aluminate, hydroxide, phosphate, silicate and sulfide.

2. The process of claim 1 wherein said anion is sulfide.

3. The process of claim 1 wherein said polymer is insolubilized polyethyleneimine (PEI).

4. The process of claim 3 wherein said PEI is insolubilized by virtue of thermal interaction with a polyfunctional carboxylic acid.

5. The process of claim 1 wherein said polymer is disposed within an open-celled cellulosic sponge, producing an open-celled product holding 30% to 80% by weight of said polymer.

6. The process of claim 5 wherein said sponge produce is of cuboid configuration having an average volumetric size less than one cubic inch.

7. The process of claim 1 further comprising treatment of said hydrogel chelation polymer with a water-dilutable prepolymer composition, and heating to remove water and cause cross-linking of said prepolymer by a condensation mechanism.

8. The process of claim 7 wherein said prepolymer composition contains said precipitative anion.

9. A hydrogel chelation polymer comprised of insolubilized PEI capable of absorbing between 90% and 300% by weight water and containing a substantially water-insoluble metal sulfide.

10. The polymer of claim 9 wherein said metal sulfide is ferric sulfide.

11. A rigid open-celled product comprised of an open-celled cellulosic sponge containing 30% to 80% by weight of insolubilized PEI containing an insolubilized metal compound and a cross-linked condensation polymer.

12. A composite structure produced by:
a) compacting a multitude of open-celled sponges containing a hydrogel chelation polymer, a substantially water-insoluble metal compound, a water-dilutable prepolymer, and sufficient water to soften said sponges, and
b) heating said compacted multitude of sponges to cause cross-linking of said prepolymer by a condensation mechanism.

* * * * *